(12) United States Patent
Li et al.

(10) Patent No.: US 11,997,322 B2
(45) Date of Patent: May 28, 2024

(54) INFORMATION DISPLAY METHOD AND APPARATUS, AND DEVICE AND STORAGE MEDIUM

(71) Applicant: BEIJING BYTEDANCE NETWORK TECHNOLOGY CO., LTD., Beijing (CN)

(72) Inventors: Yijie Li, Beijing (CN); Ke Li, Beijing (CN); Zerui Jiang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/312,003

(22) Filed: May 4, 2023

(65) Prior Publication Data
US 2023/0276078 A1    Aug. 31, 2023

Related U.S. Application Data

(63) Continuation of application No. PCT/CN2021/128945, filed on May 11, 2021.

(30) Foreign Application Priority Data

Nov. 5, 2020  (CN) .......................... 202011222611.2

(51) Int. Cl.
*H04N 21/218*   (2011.01)
*H04N 21/2187*  (2011.01)
(Continued)

(52) U.S. Cl.
CPC ....... *H04N 21/2187* (2013.01); *H04N 21/431* (2013.01); *H04N 21/4788* (2013.01)

(58) Field of Classification Search
CPC ............. H04N 21/2187; H04N 21/431; H04N 21/4788
(Continued)

(56) References Cited

U.S. PATENT DOCUMENTS

| 5,892,508 A * | 4/1999 | Howe .............. H04N 21/47202 |
| | | 348/E7.071 |
| 2001/0051989 A1* | 12/2001 | Moncreiff ............ G06Q 10/107 |
| | | 709/227 |

(Continued)

FOREIGN PATENT DOCUMENTS

| CN | 104468623 A | 3/2015 |
| CN | 106899517 A | 6/2017 |

(Continued)

OTHER PUBLICATIONS

International Search Report (with English translation) and Written Opinion issued in PCT/CN2021/128945, dated Jan. 27, 2022, 13 pages provided.

(Continued)

*Primary Examiner* — Dominic D Saltarelli
(74) *Attorney, Agent, or Firm* — HSML P.C.

(57) ABSTRACT

An information display method and apparatus, and a device and a storage medium are provided. The information display method includes: when a first trigger operation for a target live broadcast room is detected, displaying a video playing page of a target live broadcast room, where a comment area is set on the video playing interface; displaying live broadcast room introduction information of the target live broadcast room at a first information display position of the comment area; and where a display duration of the live broadcast room introduction information reaches a target duration, hiding the live broadcast room introduction information. Thus, the effective permeability of video live broadcast content of a live broadcast room can be improved, thereby improving the user experience.

20 Claims, 10 Drawing Sheets

```
┌─────────────────────────────────────────────────────────┐  S210
│ A video playing interface of a target live room is      │
│ displayed in response to detecting a first trigger      │
│ operation for the target live room, where the video     │
│ playing interface is provided with a comment area       │
└─────────────────────────────────────────────────────────┘
                            │
                            ▼                               S220
┌─────────────────────────────────────────────────────────┐
│ Introduction information of the target live room is     │
│ displayed at a first information display position in    │
│ the comment area                                        │
└─────────────────────────────────────────────────────────┘
                            │
                            ▼                               S230
┌─────────────────────────────────────────────────────────┐
│ When a display duration of the introduction information │
│ of the live room reaches a target duration, the         │
│ introduction information of the target live room is     │
│ hidden                                                  │
└─────────────────────────────────────────────────────────┘
```

(51) Int. Cl.
*H04N 21/431* (2011.01)
*H04N 21/478* (2011.01)
*H04N 21/4788* (2011.01)

(58) Field of Classification Search
USPC ........................................................ 725/105
See application file for complete search history.

(56) References Cited

U.S. PATENT DOCUMENTS

| | | | |
|---|---|---|---|
| 2005/0192822 A1* | 9/2005 | Hartenstein | G06Q 50/01 |
| | | | 705/319 |
| 2014/0150029 A1 | 5/2014 | Avedissian et al. | |
| 2016/0094876 A1 | 3/2016 | Nelson et al. | |
| 2019/0394507 A1 | 12/2019 | Hardee et al. | |
| 2022/0075947 A1* | 3/2022 | Swvigaradoss | G06F 40/289 |

FOREIGN PATENT DOCUMENTS

| | | | |
|---|---|---|---|
| CN | 106982394 A | 7/2017 |
| CN | 108111918 A | 6/2018 |
| CN | 108810602 A | 11/2018 |
| CN | 110134480 A | 8/2019 |
| CN | 110658961 A | 1/2020 |
| CN | 111835623 A | 10/2020 |
| CN | 112351300 A | 2/2021 |
| IN | 106792229 A | 5/2017 |

OTHER PUBLICATIONS

The extended European search report issued in European Application No. 21888649.7, mailed Feb. 22, 2024.

\* cited by examiner

INFORMATION DISPLAY METHOD AND APPARATUS, AND DEVICE AND STORAGE MEDIUM

The present application is a continuation of International Application No. PCT/CN2021/128945, filed on Nov. 5, 2021 which claims priority to Chinese Patent Application No. 202011222611.2, titled "INFORMATION DISPLAY METHOD AND APPARATUS, AND DEVICE AND STORAGE MEDIUM", filed on Nov. 5, 2020 with the China National Intellectual Property Administration, both of which are incorporated herein by reference in their entireties.

FIELD

The present disclosure relates to the field of information processing technology, and in particular to an information display method, apparatus and device, and a medium.

BACKGROUND

With the rapid development of computer technology and mobile communication technology, various video live platforms based on electronic devices have been widely used, which greatly enriches people's daily life. Users can easily view video live and interact with video providers through various video live platforms.

After logging into a video live platform, a user can enter live rooms of different anchors to view video lives. In order to find a video live of interest, the user enters different live rooms to view video lives. After viewing the video live for a period of time, the user determines whether the user is interested in the video live, and stays in the live room to continuously view the video live only in the case that the user is interested in the video live. However, if not wonderful video live or a meaningless screen is viewed when the user enters the live room, the user will quickly leave the live room, which may reduce the view count of the live streaming, resulting in bad user experience.

SUMMARY

In order to solve the above technical problems or at least partially solve the above technical problems, an information display method, apparatus and device, and a medium are provided according to the embodiments of the present disclosure.

In a first aspect, an information display method is provided according to an embodiment of the present disclosure. The method includes:
- displaying a video playing interface of a target live room in response to detecting a first trigger operation for the target live room, where the video playing interface is provided with a comment area;
- displaying introduction information of the target live room at a first information display position in the comment area; and
- hiding the introduction information of the target live room in a case that a display duration of the introduction information of the target live room reaches a target duration.

In a second aspect, an information display apparatus is provided according to an embodiment of the present disclosure. The apparatus includes a first display unit, a second display unit, and a third display unit.

The first display unit is configured to display a video playing interface of a target live room in response to detecting a first trigger operation for the target live room, where the video playing interface is provided with a comment area.

The second display unit is configured to display introduction information of the target live room at a first information display position in the comment area.

The third display unit is configured to hide the introduction information of the target live room in a case that a display duration of the introduction information of the target live room reaches a target duration.

In a third aspect, an information display device is provided according to an embodiment of the present disclosure. The device includes a memory and a processor. The memory is configured to store executable instructions. The processor is configured to read the executable instructions from the memory and execute the executable instructions to implement the information display method according to the first aspect.

In a fourth aspect, a computer readable storage medium is provided according to an embodiment of the present disclosure. The computer readable storage medium stores a computer program that, when executed by a processor, causes the processor to implement the information display method according to the first aspect.

The technical solutions according to the embodiments of the present disclosure have the following advantages compared with the conventional technology.

With the information display method, apparatus and device and the medium according to the embodiments of the present disclosure, in response to detecting the first trigger operation performed by the user for the target live room, the video playing interface of the target live room may be displayed, where the video playing interface is provided with the comment area. The introduction information of the target live room is fixedly displayed at the first information display position in the comment area until the introduction information of the live room is displayed for the target duration, and then the introduction information of the live room is hidden. In this way, the user can acquire the video live content of the target live room through the introduction information of the live room within the target duration after entering the target live room, which increases the view count of the live streaming. In addition, after the user enters the target live room for the target duration, the introduction information of the live room is automatically hidden, which prevents the introduction information of the live room from blocking the video live content, thereby improving the user experience.

BRIEF DESCRIPTION OF THE DRAWINGS

The above and other features, advantages and aspects of the embodiments of the present disclosure will be more apparent in conjunction with the drawings and with reference to the following embodiments. The same or similar reference numerals throughout the drawings represent the same or similar elements. It should be understood that the drawings are schematic and the components and elements are unnecessarily drawn to scale.

DETAILED DESCRIPTION OF EMBODIMENTS

Figure 1:
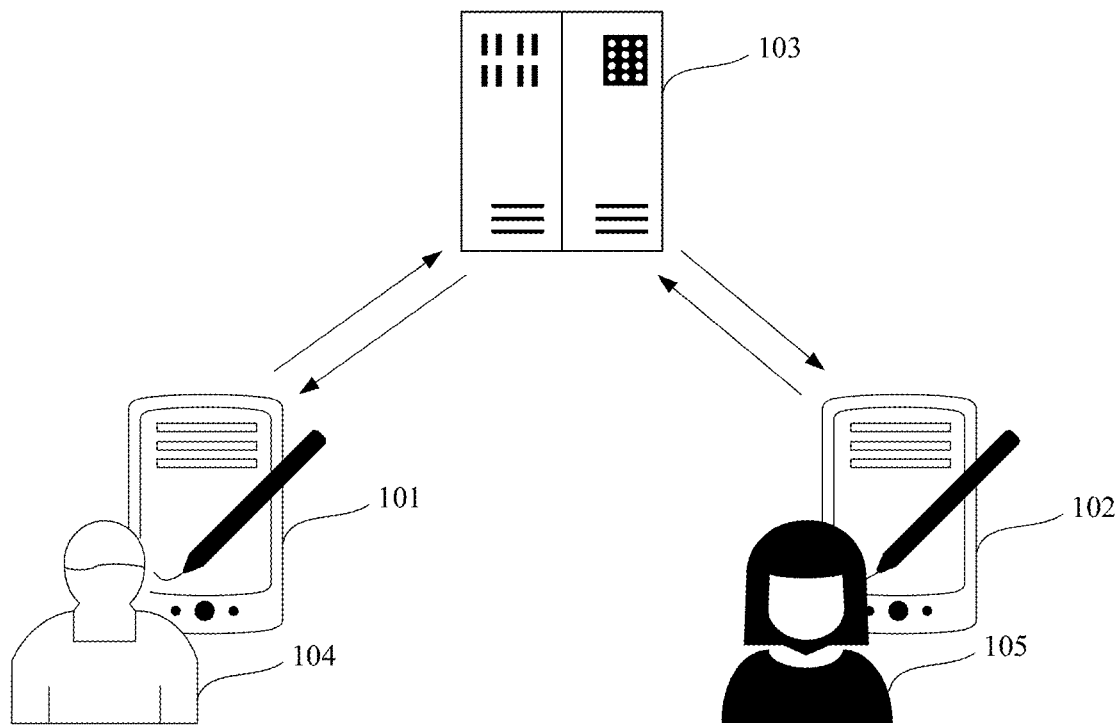
FIG. 1 is a schematic diagram showing an architecture for an information display according to an embodiment of the present disclosure.

Embodiments of the present disclosure are to be described in more detail below with reference to the drawings. Although some embodiments of the present disclosure are illustrated in the drawings, it should be understood that the present disclosure may be embodied in various forms and should not be construed as limited to the embodiments set forth herein. Instead, these embodiments are provided for a thorough and complete understanding of the present disclosure. It should be understood that the drawings and embodiments of the present disclosure are only for illustrative purposes, and are not intended to limit the protection scope of the present disclosure.

It should be understood that the steps described in the method embodiments of the present disclosure may be performed in a different order and/or in parallel. Furthermore, method embodiments may include an additional step and/or an illustrated step may not be performed. The scope of the present disclosure is not limited in this regard.

The term "including" and variations thereof herein are open-ended inclusions, that is, "including but not limited to". The term "based on" indicates "based at least in part on." The term "an embodiment" means "at least one embodiment", the term "another embodiment" means "at least one another embodiment", and the term "some embodiments" means "at least some embodiments". Definitions of other terms are given in the description below.

It should be noted that the concepts such as "first" and "second" herein are only to distinguish one apparatus, module or unit from another, rather than limit the order or interdependence of functions performed by these apparatuses, modules or units.

It should be noted that determiners such as "a" and "a plurality" herein are illustrative rather than restrictive, and those skilled in the art should understand that unless the context clearly indicates otherwise, the determiners should be understood as "one or more".

The names of messages or information exchanged between multiple apparatuses in the embodiments of the present disclosure are only for illustrative purposes, and are not intended to limit the scope of the messages or information.

An information display method according to an embodiment of the present disclosure may be applied to the architecture shown in FIG. 1, which is described in detail in combination with FIG. 1.

FIG. 1 is a schematic diagram showing architecture for an information display according to an embodiment of the present disclosure.

As shown in FIG. 1, the architecture may include a client device which may include at least one live viewing device 101 and at least one live recording device 102, and a server device which may include at least one server 103. The live viewing device 101 and the live recording device 102 may be connected to the server 103 and interact with the server 103 through a network protocol such as Hyper Text Transfer Protocol over Secure Socket Layer (HTTPS). The live viewing device 101 and the live recording device 102 may be electronic devices. The electronic device may be a device with a communication function such as a mobile phone, a tablet computer, a desktop computer, a notebook computer, an in-vehicle terminal, a wearable electronic device, an all-in-one computer, and a smart home device; and may also be a device simulated with a virtual machine or an emulator. The server 103 may be a device with storage and computing functions such as a cloud server or a server cluster.

Based on the above architecture, the live anchor 105 may record a video live in a video live platform on the live recording device 102. The video live platform may be a video live application or a video live website. A live audience 104 may enter different live rooms in the video live platform on the live viewing device 101 to view the video lives. The server 103 may receive the video live content recorded by the live recording device 102 in the video live platform, and send the received video live content to the live viewing device 101 entering the live room in the video live platform.

Therefore, in order to increase the view count of the live streaming in the live room and improve the experience of the live audience 104, introduction information of the live room may be displayed in the following way after the live audience 104 enters the live room. Here, the video live platform being a video live application is taken as an example. When the live viewing device 101 detects a first trigger operation performed by the live audience 104 for a target live room, a video playing interface of the target live room may be displayed. The video playing interface may be provided with a comment area, and the introduction information of the target live room is displayed at a first information display position in the comment area. After the display duration of the introduction information of the live room reaches a target duration, the introduction information of the live room is hided. In this way, the live audience 104 can acquire the video live content of the target live room through the introduction information of the live room, in the target duration after entering the target live room, which can increase the view count of the live streaming and improve the experience of the live audience 104.

Further, in order to further increase the view count of the live streaming in the live room and improve the experience of the live audience 104, historical interaction information may further be displayed in the following way after the live audience 104 enters the live room. The video live platform being a video live application is taken as an example. When the live viewing device 101 detects the first trigger operation performed by the live audience 104 for the target live room, historical interaction information of the target live room may be displayed at a second information display position in the comment area of the video playing interface after the video playing interface of the target live room is displayed. In this way, the live audience 104 can acquire the video live content of the target live room through the historical interaction information after entering the target live room, which further increases the view count of the live streaming and improves the experience of the live audience 104.

Based on the above architecture, an information display method according to embodiments of the present disclosure is described below in conjunction with FIG. 2 to FIG. 10. In some embodiments, the information display method may be performed by the live viewing device 101 included in the client device shown in FIG. 1. In other embodiments, when the live recording device 102 included in the client device shown in FIG. 1 is used for viewing a video live, the information display method may also be performed by the live recording device 102, which will not be limited herein. The live viewing device 101 and the live recording device 102 may be electronic devices. The electronic device may be a device with a communication function such as a mobile phone, a tablet computer, a desktop computer, a notebook computer, an in-vehicle terminal, a wearable electronic device, an all-in-one computer, and a smart home device; and may also be a device simulated with a virtual machine or an emulator.

An information display method according to an embodiment of the present disclosure will be described below by taking a case that the information display method is performed by the live viewing device 101 shown in FIG. 1 as an example.

Figure 2:
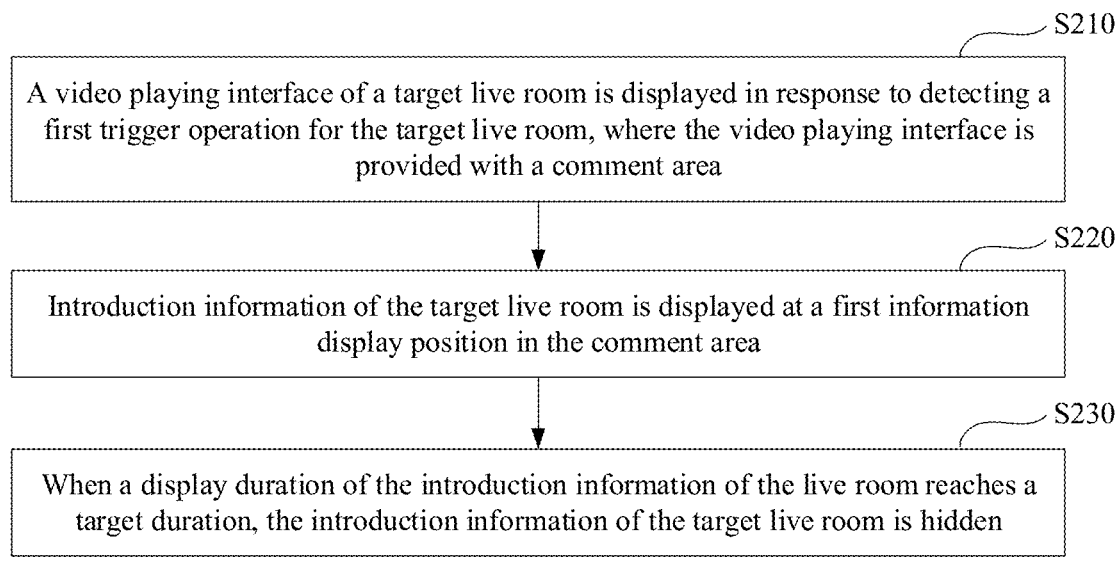
FIG. 2 is a schematic flowchart of an information display method according to an embodiment of the present disclosure.

FIG. 2 is a schematic flowchart of an information display method according to an embodiment of the present disclosure.

As shown in FIG. 2, the information display method may include the following steps S210 to S230.

In step S210, a video playing interface of a target live room is displayed in response to detecting a first trigger operation for the target live room, where the video playing interface is provided with a comment area.

In an embodiment, the live audience may input, on the live viewing device, the first trigger operation for entering the target live room in a video live platform to view a video live in the target live room. In response to detecting the first trigger operation performed by the live audience for the target live room, the live viewing device may display the video playing interface of the target live room. The video playing interface may be used for displaying a video live screen, and the video playing interface may be provided with a comment area overlapping with the video live screen.

The live audience may be any user who views the live. The video live platform may be a video live application or a video live website.

In an embodiment of the present disclosure, the first trigger operation may be an operation for triggering display of the video playing interface of the target live room.

In some embodiments, the first trigger operation may be an operation on a cover of the target live room, such as, a click operation, a long press operation, a double-click operation.

For example, when the live viewing device displays a live room browsing interface, a cover of the target live room is displayed on the live room browsing interface, and the live audience may trigger display of the video playing interface of the target live room by clicking the cover of the target live room.

In other embodiments, the first trigger operation may be an operation on a first trigger control corresponding to the target live room, such as, a click operation, a long press operation, a double-click operation. The first trigger control may be a button for triggering display of the video playing interface of the target live room. For example, the first trigger control may be a button of "Enter the live room".

For example, when the live viewing device displays the live room browsing interface, the cover of the target live room is displayed on the live room browsing interface and the button of "Enter the live room" is displayed adjacent to the cover of the live room, the live audience may trigger the display of the video playing interface of the target live room by clicking the button of "Enter the live room".

In some embodiments, the first trigger operation may be an operation on a preview window of the target live room, such as, a click operation, a long press operation, a double-click operation.

For example, when the preview window of the target live room is displayed in a floating window on the live viewing device, the live audience may trigger the display of the video playing interface of the target live room by clicking the preview window.

In some embodiments, the first trigger operation may be an operation on an icon of the target live room, such as, a click operation, a long press operation, a double-click operation.

For example, when the icon of the target live room is displayed on a desktop or any application interface of the live viewing device, the live audience may trigger the display of the video playing interface of the target live room by clicking the icon of the target live room.

In one implementation, the icon may be a shortcut entry icon.

Thus, the live audience can easily enter the video playing interface of the target live room by performing the first trigger operation in any case, further improving the use experience.

In the embodiments of the present disclosure, after the video playing interface of the target live room is displayed, a video live screen of the target live room may be displayed in the video playing interface, and a floating layer is arranged on the video live screen. A comment area is provided on the floating layer, to overlap the comment area on the video live screen.

In an implementation, the floating layer may cover at least a part of the video live screen. Specifically, the floating layer may cover all of the video live screens, an upper half of the video live screen, a lower half of the video live screen, or the middle of the video live screen, which will not be limited herein.

In an implementation, the floating layer may have a preset transparency. The transparency may be set according to needs and is not limited here.

In step S220, introduction information of the target live room is displayed at a first information display position in the comment area.

The first information display position may be any position in the comment area. For example, the first information display position may be the first position for displaying information in the comment area, so that the introduction information of the live room may be displayed on the top of the comment area. For another example, the first information display position may be the last position for displaying information in the comment area, so that the introduction information of the live room may be displayed in the bottom of the comment area.

In an embodiment, multiple pieces of interaction information may be displayed from the top to the bottom in the comment area. The first information display position may be a position at which the first piece of interaction information is displayed from the top to the bottom. The last information display position may be a position at which the last piece of interaction information is displayed from the top to the bottom.

In the embodiments of the present disclosure, the introduction information of the live room may include at least one of anchor information, a live feature label and preset display information.

The live feature label may include a live category label, a live time label, and the like. The live category label may be used for showing a category of the video live. The live time label may be used for predicting a live time.

In an implementation, priorities may be preset for the labels among the anchor information and the live feature labels. The live viewing device may acquire the priorities of the feature labels in the introduction information of the target live room, determine an order of displaying the feature labels based on the priorities, and then display the feature labels according to the order.

The preset display information may be information used for introducing the anchor and/or explaining the video live content, and the number of words included in the information is less than or equal to a preset number of words. The preset display information may include at least one of: display information configured by a server of the video live platform, for example, the server 103 shown in FIG. 1, for the target live room, and display information preset by the anchor of the target live room, which will be described in detail hereafter.

In an implementation, the anchor information may be for example an anchor nickname.

Figure 3:
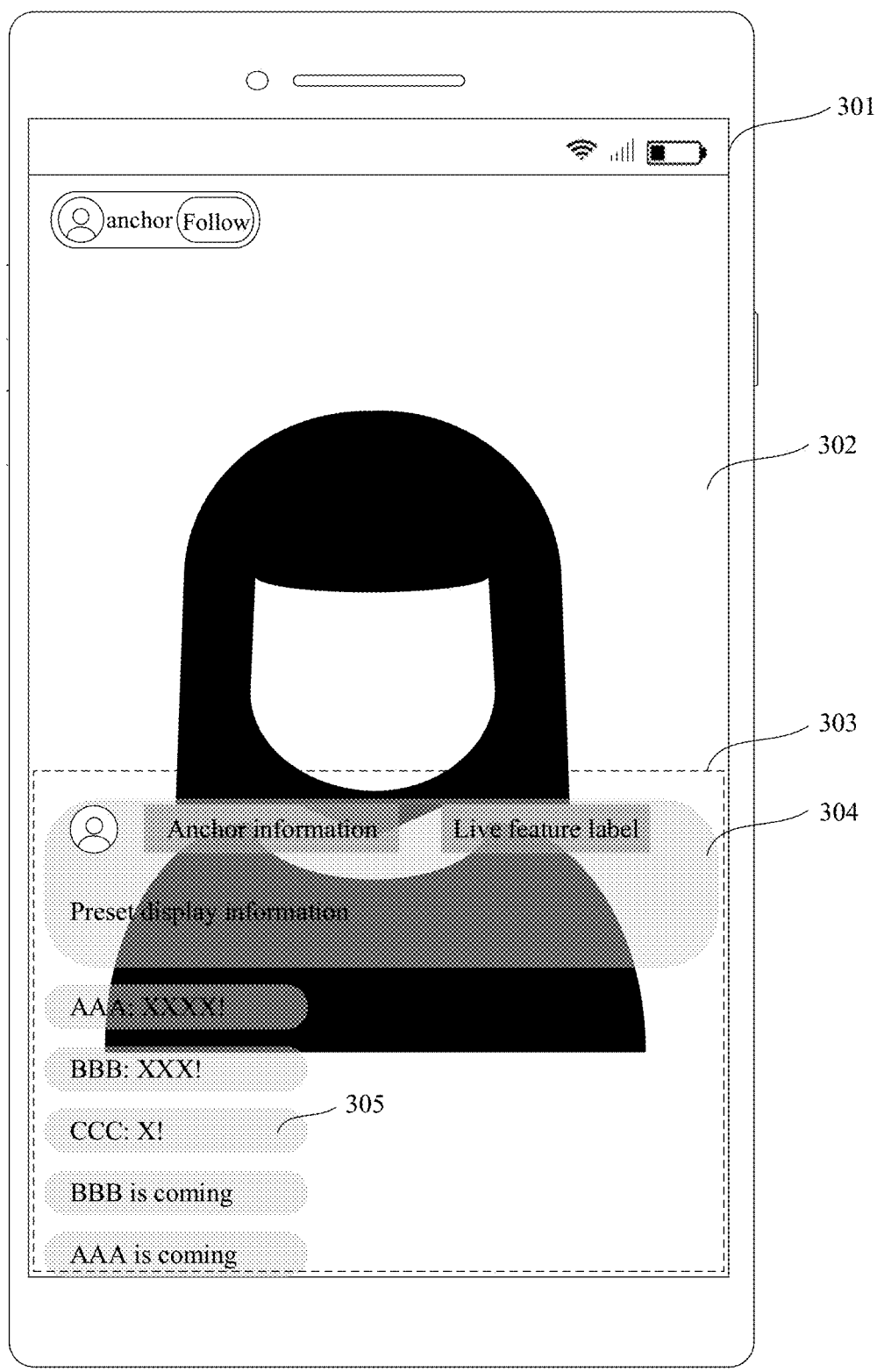
FIG. 3 is a schematic diagram of a video playing interface according to an embodiment of the present disclosure.

FIG. 3 is a schematic diagram of a video playing interface according to an embodiment of the present disclosure. As shown in FIG. 3, a video live screen 302 is displayed on the video playing interface 301. A comment area 303 is overlapped with a lower half of the video live screen 302. Introduction information 304 of the live room is displayed in the top of the comment area 303. The introduction information 304 of the live room may include anchor information, a live feature label, and preset display information.

Referring to FIG. 2, in step S230, when a display duration of the introduction information of the live room reaches a target duration, the introduction information of the target live room is hidden.

In an embodiment, after displaying the introduction information of the live room, the live viewing device may time the display duration of the introduction information of the live room. The live viewing device may display the introduction information of the live room at the first information display position in the comment area in the case that the display duration of the introduction information of the live room is less than the target duration, and hide the introduction information of the live room in the case that the display duration of the introduction information of the live room is equal to the target duration.

The target duration may be preset according to the demand, which will not be limited herein.

A case in which the target duration is 10 s and the first information display position is the first information display positon in the comment area is taken as an example. The live viewing device may display the introduction information of the live room on the top of the comment area within 10 s after the live audience enters the target live room, and hide the introduction information of the live room after 10 s from the introduction information of the live room is displayed on the top.

In the embodiments of the present disclosure, in an implementation, after step S230, the information display method may further include: displaying to-be-displayed interaction information in the comment area.

Specifically, the live viewing device may hide the introduction information of the live room after the display duration of the introduction information of the live room reaches the target duration, and display the to-be-displayed interaction information using all information display positions in the comment area, so that the introduction information of the live room and other displayed information are moved out together.

In an embodiment of the present disclosure, in response to detecting the first trigger operation performed by the user for the target live room, the video playing interface of the target live room may be displayed, where the video playing interface is provided with the comment area. The introduction information of the target live room is fixedly displayed at the first information display position in the comment area until the display duration of the introduction information of the live room reaches the target duration. Then, the introduction information of the live room is hidden. In this way, the user can acquire the video live content of the target live room through the introduction information of the live room within the target duration after entering the target live room, which increases the view count of the live streaming. In addition, after the user enters the target live room for the target duration, the introduction information of the live room is automatically hidden, which prevents the introduction information of the live room from blocking the video live content, thereby improving the user experience.

In another embodiment of the present disclosure, in order to display the introduction information of the live room at the first information display position in the comment area, before step S220, the information display method may further include: receiving the introduction information of the live room; and inserting the introduction information of the live room into a first queue position of a to-be-displayed information queue.

Accordingly, step S220 may include: displaying the introduction information of the live room at a first information display position corresponding to the first queue position.

Specifically, after detecting the first trigger operation for the target live room and before displaying the introduction information of the target live room, the live viewing device may receive the introduction information of the live room, and insert the introduction information of the live room into the first queue position of the to-be-displayed information queue. In this way, the live viewing device can display the introduction information of the live room, at the first information display position corresponding to the first queue position in the comment area.

In an implementation, if the first queue position is the first position of the to-be-displayed information queue, the first information display position may be the first position for displaying information in the comment area, so as to display the introduction information of the live room at the top of the comment area.

In the case that the first queue position is the first position of the to-be-displayed information queue, the introduction information of the live room may be inserted into the first queue position of the to-be-displayed information queue. Then, the number of words of the introduction information of the live room is subtracted from the number of total displayable words in the comment area to obtain the number of remaining displayable words in the comment area. Finally, other to-be-displayed information in the to-be-displayed information queue is determined based on the number of remaining displayable words in the comment area.

In an implementation, if the first queue position is the last position in the to-be-displayed information queue, the first information display position may be the last position for displaying information in the comment area.

In the case that the first queue position is the last position of the to-be-displayed information queue, the number of words of the introduction information of the live room may be subtracted from the number of total displayable words in the comment area to obtain the number of remaining displayable words in the comment area. Then, other to-be-displayed information in the to-be-displayed information queue is determined based on the number of remaining displayable words in the comment area. Finally, the introduction information of the live room is inserted into the last position in the to-be-displayed information queue.

Thus, in the embodiments of the present disclosure, the introduction information of the live room may be inserted into a designated position of the to-be-displayed information queue, so as to position display of the introduction information of the live room.

In another embodiment of the present disclosure, in order to further increase the view count of the live streaming in the live room and improve the user experience, after step S210, the information display method may include: receiving historical interaction information of the target live room; inserting the historical interaction information into a second queue position of the to-be-displayed information queue; and displaying the historical interaction information at a second information display position corresponding to the second queue position.

In an embodiment, after detecting the first trigger operation for the target live room, the live viewing device may receive the historical interaction information of the target live room and insert the historical interaction information into the second queue position of the to-be-displayed information queue, so that the live viewing device displays the historical interaction information at the second information display position corresponding to the second queue position in the comment area.

The historical interaction information may be interaction information within a preset duration before the user enters the target live room. The preset duration may be set as needed, which will not be limited herein. For example, the preset duration may be 0 s to 5 s.

In an implementation, the interaction information may include at least one of audience interaction information and anchor interaction information. The audience interaction information may include operation information related to the audience in the live room, such as at least one of comment information, like information, gift information, information of entering the live room and information of leaving the live room. The anchor interaction information may include operation information related to the anchor in the live room, such as at least one of comment reply information, commodity listing information, and red packet distribution information.

In an embodiment of the present disclosure, the second queue position of the to-be-displayed information queue may be a queue position other than the first queue position.

In the case that the first queue position is the first position of the to-be-displayed information queue, the second queue position is any position from the second position to the last position in the to-be-displayed information queue. In the case that the first queue position is the last position of the to-be-displayed information queue, the second queue position is any position from the first position to the penultimate position in the to-be-displayed information queue.

In an embodiment of the present disclosure, the second information display position corresponding to the second queue position may be any information display position other than the first information display position in the comment area. In the case that the first information display position is the first position for displaying information in the comment area, the second information display position may be any position from the second position for displaying information to the last position for displaying information in the comment area. In the case that the first information display position is the last position for displaying information in the comment area, the second information display position may be any position from the first position for displaying information to the penultimate position for displaying information in the comment area.

Referring to FIG. 3, the video live screen 302 is displayed on the video playing interface 301. The comment area 303 is overlapped with a lower half of the video live screen 302. The introduction information 304 of the live room is displayed in the top of the comment area 303. In addition, in the comment area 303, five pieces of historical interaction information 305 such as "AAA: XXXX!", "BBB: XXX!", "BBB: X!", "BBB is coming" and "AAA is coming" are further displayed. The historical interaction information 305 may be sequentially displayed below the introduction information 304 of the live room from top to bottom.

According to the embodiments of the present disclosure, in an implementation, after the number of remaining displayable words in the comment area is obtained, displayable interaction information may be sequentially selected from the historical interaction information in a chronological order of reception time, and the number of the displayable interaction information is less than or equal to the number of the remaining displayable words in the comment area. Then, the displayable interaction information is inserted into the to-be-displayed information queue.

In an embodiment of the present disclosure, the live viewing device may display the historical interaction information before the introduction information of the live room is displayed, when the introduction information of the live room is displayed, or after the introduction information of the live room is displayed, which will not be limited herein.

According to an embodiment of the present disclosure, in an implementation, displayable interaction information may be sequentially selected from interaction information before the displayed interaction information in the historical interaction information at preset intervals according to a chronological order of reception time, so that the live audience can know more about the interaction of the live room.

Thus, in an embodiment of the present disclosure, the historical interaction information of the target live room can be displayed. Thus, the user can acquire the video live content of the target live room through the historical interaction information after entering the target live room, further increasing the view count of the live streaming and improving the user experience.

In another embodiment of the present disclosure, in order to receive the introduction information of the live room, the live viewing device may further send an information acquisition request to the server. The server provides the introduction information of the live room to the live viewing device. In this way, the live viewing device can actively obtain the introduction information of the live room.

In an embodiment, in response to detecting the first trigger operation for the target live room, the live viewing device may send an information acquisition request to the server. When receiving the information acquisition request, the server may read, in response to the information acquisition request, the introduction information of the target live room from a storage device for storing introduction information of various live rooms in an information pull storage system, and provide the introduction information of the target live room to the live viewing device. The live viewing device may receive the introduction information fed back from the server.

In an implementation, before the introduction information of the live room is received, the information display method may further include: sending an information acquisition request to the server. The information acquisition request is used for enabling the server to provide the introduction information of the live room in a case of determining that the target live room has a permission to display the introduction information of the live room.

In an embodiment, in response to detecting the first trigger operation for the target live room, the live viewing device may send an information acquisition request to the server. When receiving the information acquisition request, the server may determine, in response to the information acquisition request, whether the target live room has a permission to display the introduction information; read, in the case of determining that the target live room has the permission to display the introduction information, the introduction information of the target live room from a storage device used for storing introduction information of various live rooms in the information pull storage system; and provide the introduction information to the live viewing device. The live viewing device receives the introduction information fed back from the server.

The server may pre-store a display permission identification of the target live room, and the server may acquire the display permission identification of the target live room. If the display permission identification characterizes that a permission to display introduction information is available, it is determined that the target live room has a permission to display the introduction information of the target live room. If the display permission identification characterizes that the permission to display the introduction information is unavailable, it is determined that the target live room does not have the permission to display the introduction information of the target live room.

In an implementation, the information acquisition request may further be used for causing the server to provide the historical interaction information, so that the live viewing device can actively acquire the historical interaction information.

In an embodiment, in response to detecting the first trigger operation for the target live room, the live viewing device may send an information acquisition request to the server. When receiving the information acquisition request, the server may read the introduction information of the target live room from a storage device used for storing introduction information of various live rooms in the information pull storage system; read historical interaction information of the target live room from a storage device used for storing historical interaction information of various live rooms; package the introduction information and the historical interaction information of the target live room separately; and provide the introduction information and the historical interaction information to the target live viewing device. The live viewing device receives the introduction information and the historical interaction information fed back from the server.

In an embodiments of the present disclosure, when establishing the target live room, the server may receive the display permission identification and the introduction information of the target live room from the live recording device, and store the introduction information of the target live room in the storage device used for storing the introduction information of various live rooms in the information pull storage system. Thus, when receiving the information acquisition request from the live viewing device, the server may directly read the introduction information and the historical interaction information of the target live room from different storage devices, and then package and provide the introduction information and the historical interaction information of the target live room separately. In this way, a large flow required by packaging mixed information is avoided. After receiving the introduction information and the historical interaction information of the target live room, the live viewing device may easily insert the introduction information of the target live room into a designated position in the to-be-displayed information queue, so as to display the introduction information of the target live room at a fixed position.

It should be noted that the live recording device may be the live recording device 102 shown in FIG. 1. When the live viewing device 101 included in the client device shown in FIG. 1 is used for recording video live content, the live recording device may also be the live viewing device 101 shown in FIG. 1.

In an embodiment of the present disclosure, the anchor may set the display permission and the introduction information of the target live room in various ways on the live recording device, which will not be limited herein.

An example is described below to explain a process of setting the display permission and the introduction information of the target live room.

In an implementation, the display permission identification may be determined based on a state of a starting control used for enabling live room introduction in the target live room. In the case that the starting control is turned on, the display permission identification characterizes that a permission to display the introduction information of the live room is available. In the case that the starting control is turned off, the display permission identification characterizes that the permission to display the introduction information of the live room is unavailable.

Figure 4:
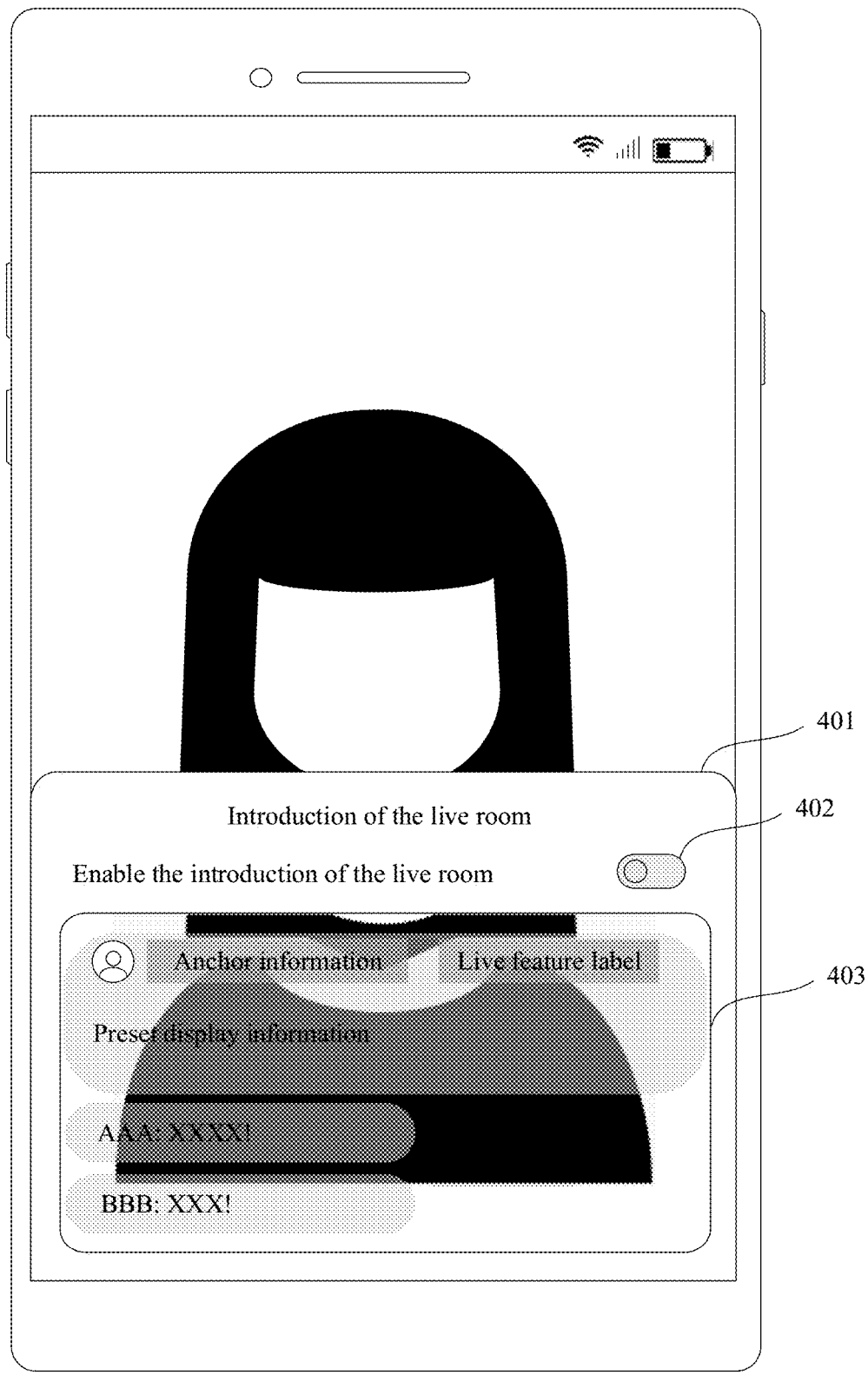
FIG. 4 is a schematic diagram of an information setting interface according to an embodiment of the present disclosure.

FIG. 4 is a schematic diagram of an information setting interface according to an embodiment of the present disclosure. As shown in FIG. 4, a live room introduction setting control 401 may be displayed on the information setting interface. The live room introduction setting control 401 may be provided with a starting control 402. The anchor may click the starting control 402 to change the state of the starting control 402. When the start control 402 is turned off, a preview image 403 of the introduction information of the live room may be displayed in the live room introduction setting control 401. The anchor can view a display effect of the introduction information of the live room through the preview image 403.

In an implementation, feature labels such as the anchor information and the live feature label may be selected by the anchor from multiple preset labels. The preset labels may be generated based on anchor personal information, live setting information, historical live data, and the like.

In an implementation, feature labels such as the anchor information and the live feature label may be independently set by the anchor.

Figure 5:
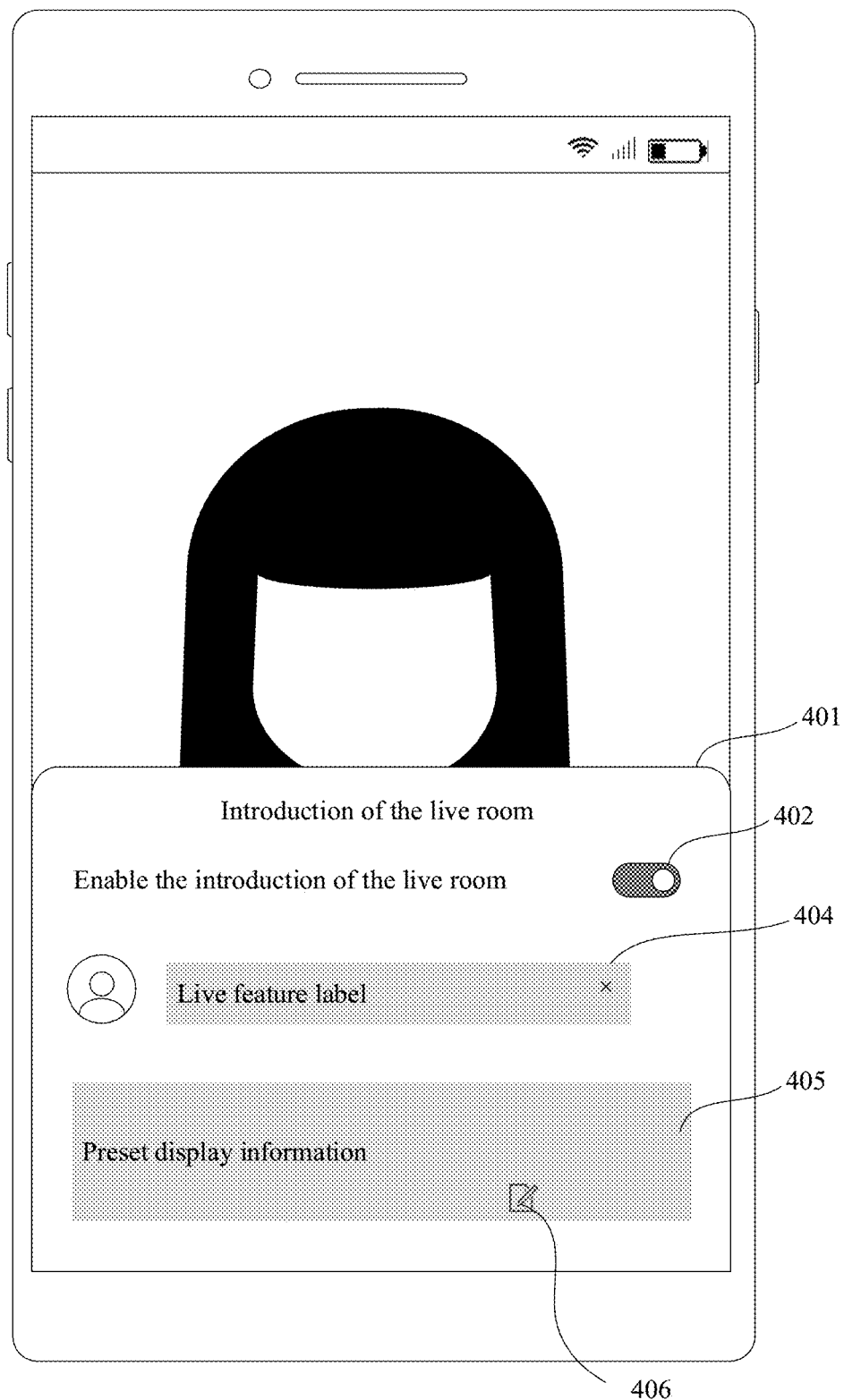
FIG. 5 is a schematic diagram of an information setting interface according to another embodiment of the present disclosure.
Figure 6:
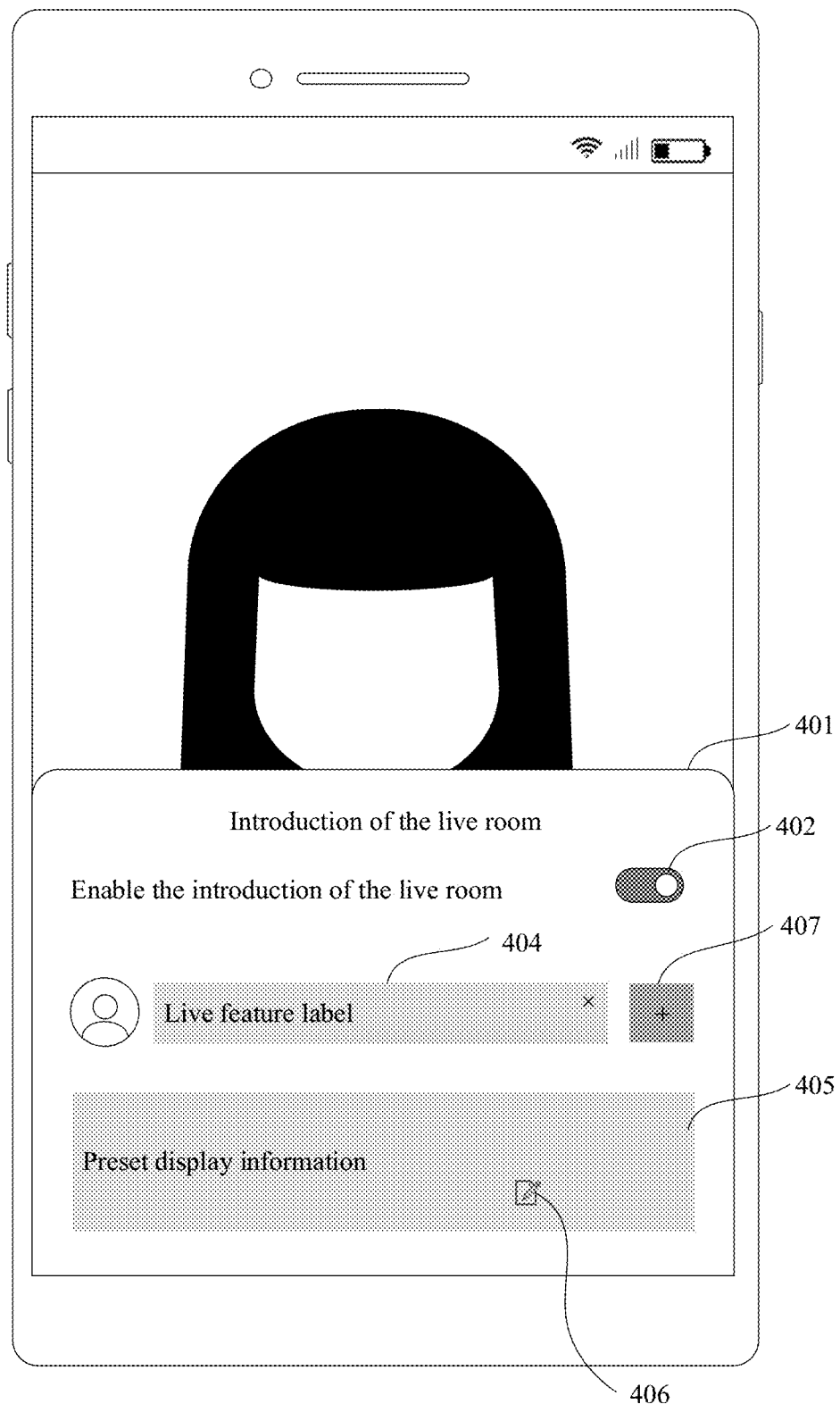
FIG. 6 is a schematic diagram of an information setting interface according to another embodiment of the present disclosure.
Figure 7:
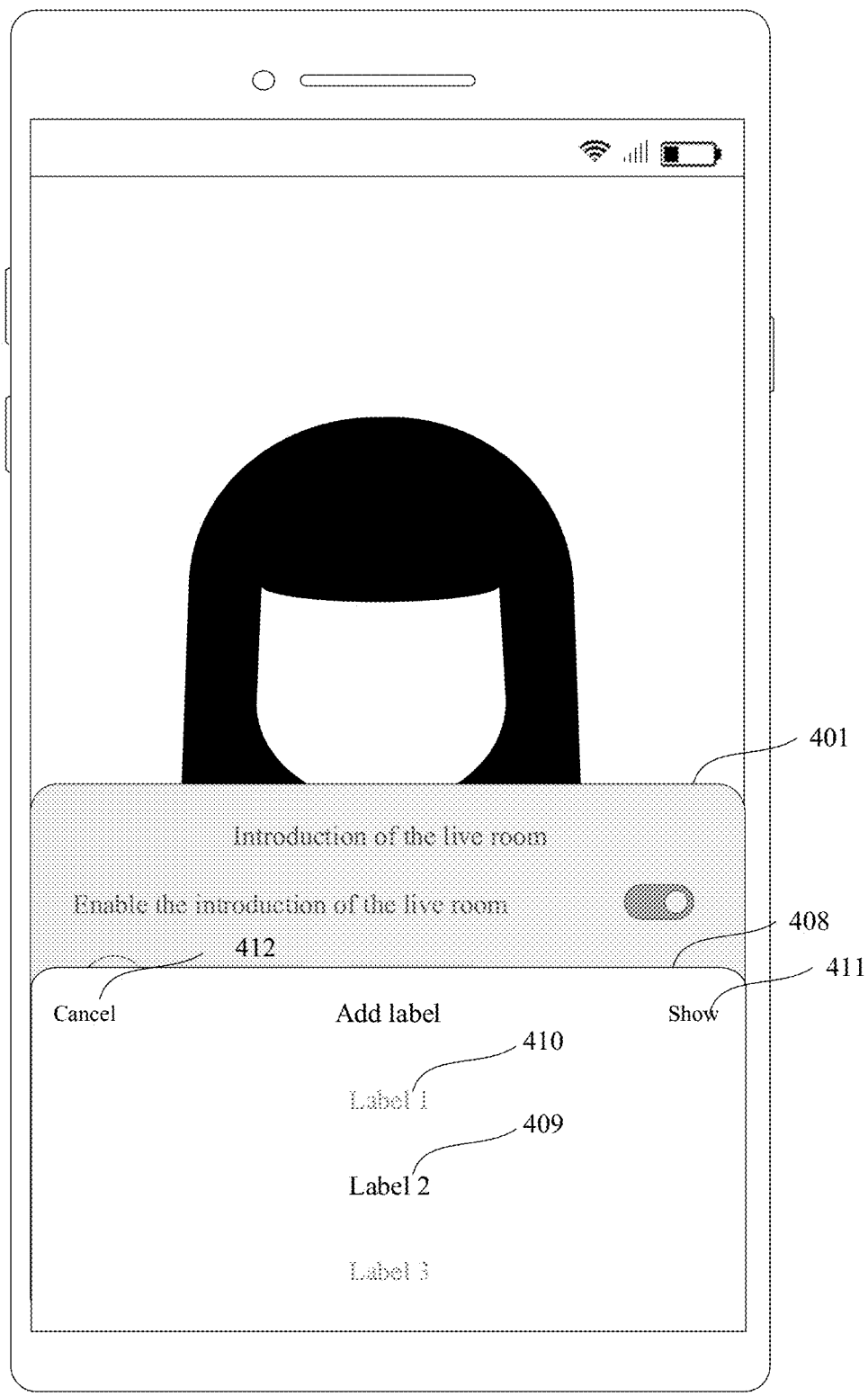
FIG. 7 is a schematic diagram of an information setting interface according to another embodiment of the present disclosure.

FIG. 5 is a schematic diagram of an information setting interface according to another embodiment of the present disclosure. FIG. 6 is a schematic diagram of an information setting interface according to another embodiment of the present disclosure. FIG. 7 is a schematic diagram of an information setting interface according to another embodiment of the present disclosure.

As shown in FIG. 5, when the starting control 402 in the live room introduction setting control 401 is turned on, all preset labels 404 may be displayed in the live room introduction setting control 401. For each label 404, the anchor may delete the label 404 through an "X" button behind the label 404. After the anchor deletes the label 404, a label adding control 407 may be displayed behind the remaining labels 404. As shown in FIG. 6, the anchor may click the label adding control 407 to re-add the deleted label back to the live room introduction setting control 401. After the anchor clicks the label adding control 407, as shown in FIG. 7, a label adding control 408 for adding a label may be overlapped with the live room introduction setting control 401. The label adding control 408 may be provided with a selectable area 409 and an un-selectable area 410. A label arranged in the selectable area 409 may be displayed in black, and a label arranged in the un-selectable area 410 may be displayed in gray, so that the anchor distinguishes the selectable label from the un-selectable label. After determining a selected label, the anchor may click the "display" button 411 to re-add the selected label to the live room introduction setting control 401. The anchor may also click a "cancel" button 412 to cancel the re-addition of the deleted label.

It should be noted that the function of displaying the introduction information of the live room still take effect even if the anchor deletes all the labels.

In an implementation, the preset display information may include at least one of display information configured by a server of the video live platform for the target live room and display information preset by the anchor of the target live room.

A method of the server configuring the display information for the target live room may include: pre-storing, in the server, multiple pieces of display information and a correspondence relationship among the display information, anchor information and live feature labels; acquiring the anchor information and a live feature label corresponding to the target live room; determining, based on the pre-stored correspondence relationship, display information corresponding to the acquired anchor information and live feature label; and using the determined display information as the preset display information of the target live room.

Referring to FIG. 5 and FIG. 6, when the starting control 402 in the live introduction setting control 401 is turned on, an information editing control 405 may further be displayed in the live introduction setting control 401. If the anchor edits the preset display information for the first time, display information configured by the server for the anchor may be displayed in the information editing control 405. If the anchor wants to modify the preset display information, the anchor may click an information editing button 406. After the anchor clicks the information editing button 406, the information editing control 405 automatically clear current display information, so that the anchor can input display information to set preset display information. If the anchor does not edit the preset display information for the first time, the information editing control 405 does not clear the current display information after the anchor clicks the information editing button 406, so that the anchor can modify the display information to set the preset display information.

In some embodiments of the present disclosure, in order to further improve user experience, the introduction information of the live room may be hidden by a manual trigger of the user in the case that the display duration of the introduction information of the live room does not reach the target duration, which will be described in detail below.

Figure 8:
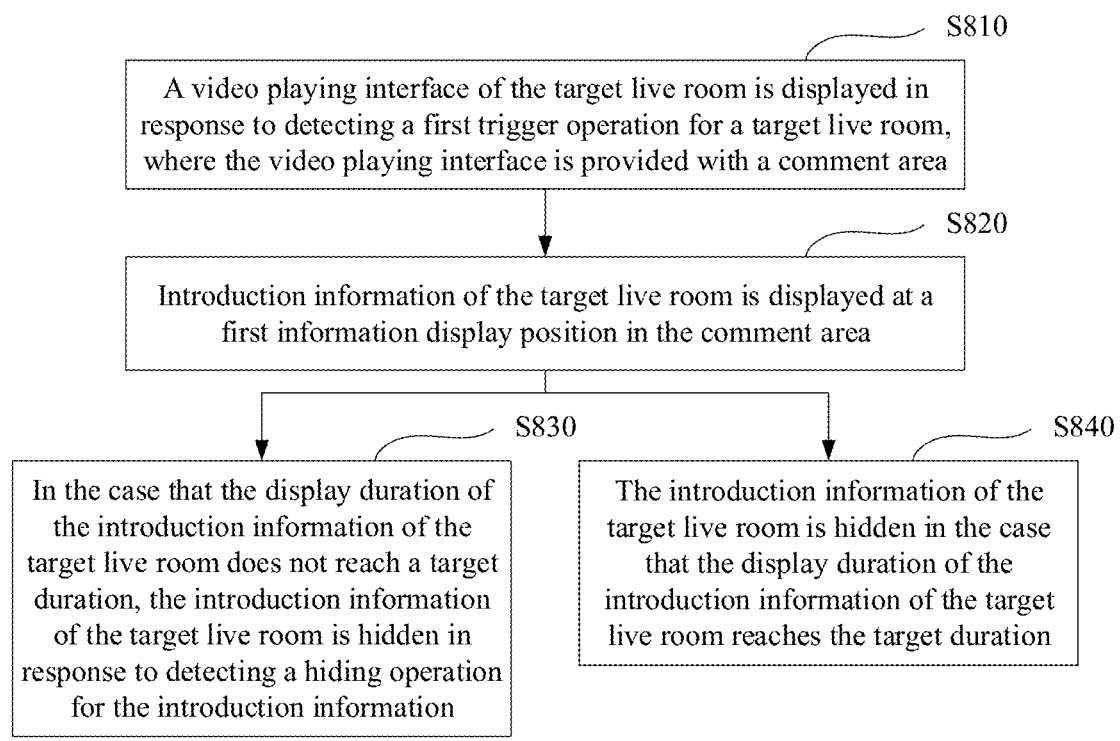
FIG. 8 is a schematic flowchart of an information display method according to another embodiment of the present disclosure.

FIG. 8 is a schematic flowchart of an information display method according to another embodiment of the present disclosure.

As shown in FIG. 8, the information display method may include the following steps S810 to S840.

In step S810, a video playing interface of the target live room is displayed in response to detecting a first trigger operation for a target live room, where the video playing interface is provided with a comment area.

In step S820, introduction information of the target live room is displayed at a first information display position in the comment area.

Steps S810 and S820 are similar to steps S210 and S220 in the embodiments shown in FIG. 2, which will not be described herein.

In step S830, in the case that the display duration of the introduction information of the target live room does not reach a target duration, the introduction information of the target live room is hidden in response to detecting a hiding operation for the introduction information.

In an embodiment of the present disclosure, in the case that the display duration of the introduction information of the target live room does not reach the target duration, the live audience may input, on the live viewing device, a hiding operation for triggering hiding of the introduction information of the target live room if the live audience does not want a continuous display of the introduction information of the target live room. The live viewing device directly hides the introduction information of the target live room in response to detecting the hiding operation for the introduction information of the target live room, rather than waiting the display duration of the introduction information of the target live room reaching the target duration.

In an embodiment, the hiding operation may be an operation for the introduction information of the live room, or an operation on a second trigger control having a function of triggering hiding of the introduction information of the live room.

In some embodiments of the present disclosure, in the case that the hiding operation is an operation for the introduction information of the live room, the hiding operation may be a click operation, a double-click operation, a long press operation or a sliding operation for the introduction information of the live room.

In some embodiments of the present disclosure, in the case that the hiding operation is an operation on the second trigger control, the second trigger control may be an information prompt identification for prompting existence of to-be-displayed interaction information. The hiding operation may be a second trigger operation for the information prompt identification.

In an implementation, the second trigger operation may be a click operation, a double-click operation, a long press operation or a sliding operation for the information prompt identification.

In an embodiment of the present disclosure, in the case that the second trigger control is the information prompt identification for prompting the existence of the to-be-displayed interaction information and the display duration of the introduction information of the target live room does not reach the target duration, before the hiding operation for the introduction information of the target live room is detected, the information display method may further include: receiving to-be-displayed interaction information; and displaying an information prompt identification corresponding to the to-be-displayed interaction information, at a preset position in the comment area.

The to-be-displayed interaction information may be interaction information of the target live room after the live audience enters the target live room. The preset position in the comment area may be any position set in advance, for example, at the bottom left of the comment area, at the bottom right of the comment area, or at the bottom middle of the comment area.

That is, in an embodiment of the present disclosure, if the live viewing device receives new interaction information in a process of displaying the introduction information of the target live room, an information prompt identification corresponding to the new interaction information may be displayed at a preset position in the comment area. The information prompt identification may be triggered by the live audience. After the live audience triggers the information prompt identification, the introduction information of the target live room is hidden, without waiting the display duration of the introduction information of the target live room reaching the target duration.

In some embodiments, the information prompt identifier may be used for prompting existence of the to-be-displayed interaction information, such as new interaction information. For example, the information prompt identification may be "new message".

In other embodiments, the information prompt identification may be used for prompting the number of pieces of the to-be-displayed interaction information such as new interaction information. For example, the information prompt identification may be "3 new messages".

Figure 9:
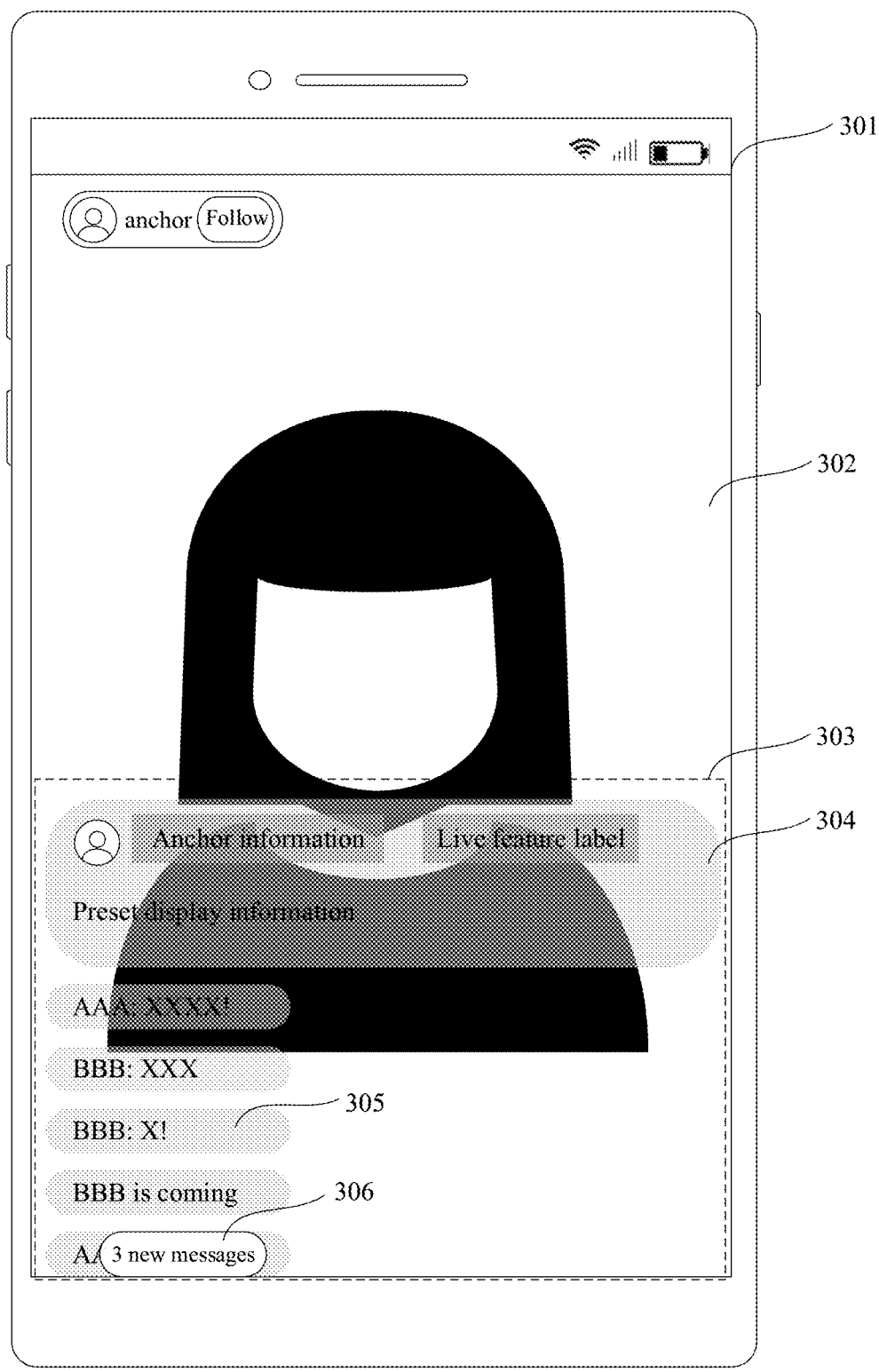
FIG. 9 is a schematic diagram of a video playing interface according to another embodiment of the present disclosure.

FIG. 9 is a schematic diagram of a video playing interface according to another embodiment of the present disclosure. As shown in FIG. 9, a video live screen 302 is displayed on a video playing interface 301. A comment area 303 is overlapped with the lower half of the video live screen 302. Introduction information 304 of the live room and five pieces of historical interaction information 305 are displayed in the comment area 303. The introduction information 304 of the live room is displayed on the top of the comment area 303. The historical interaction information 305 is sequentially displayed from top to bottom below the introduction information 304 of the live room. When the live viewing device receives three pieces of new interaction information, an information prompt identification 306 may be displayed in the bottom middle of the comment area and overlapped with the historical interaction information 305. The information prompt identification 306 may be "3 new messages".

In some embodiments of the present disclosure, in the case that the hiding operation is an operation on the second trigger control, the second trigger control may be a "hide" button and the hiding operation may be a third trigger operation for the "hide" button.

In an implementation, the third trigger operation may be a click operation, a double-click operation, a long press operation or a sliding operation on the "hide" button.

Referring to FIG. 8, in step S840, when the display duration of the introduction information of the live room reaches the target duration, the introduction information of the live room is hidden.

In an embodiment of the present disclosure, in the case that the live viewing device does not detects the hiding operation for the introduction information of the live room before the display duration of the introduction information of the live room reaches the target duration, the introduction information of the live room may be hidden when the display duration of the introduction information of the live room reaches the target duration.

Step S840 is similar to step S230 in the embodiment shown in FIG. 2, which will not be repeated herein.

In an embodiment of the present disclosure, in an implementation, after steps S830 and S840, the information display method may further include: displaying the to-be-displayed interaction information in the comment area.

In an embodiment, when the display duration of the introduction information of the live room reaches the target duration, the live viewing device may hide the introduction information of the live room, and display the to-be-displayed interaction information at all information display positions in the comment area, to remove the introduction information of the live room and other displayed information together.

As shown in FIG. 9, when the live audience clicks the identification "3 new messages", a preset duration displayed on the top of the comment area is no longer effective. The live viewing device may hide the introduction information 304 of the live room, as shown in FIG. 10.

Figure 10:
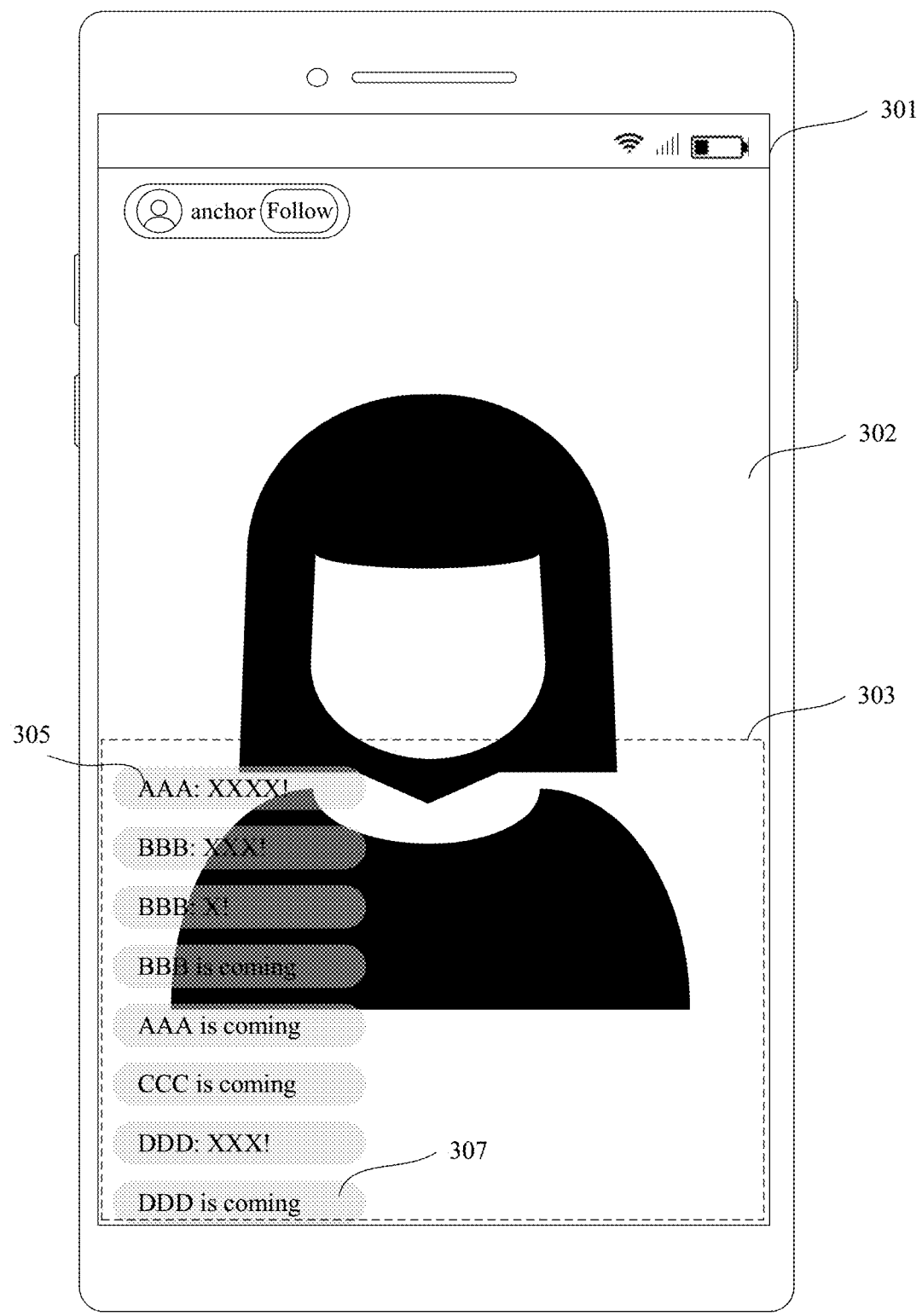
FIG. 10 is a schematic diagram of a video playing interface according to another embodiment of the present disclosure.

FIG. 10 is a schematic diagram of a video playing interface according to another embodiment of the present disclosure. As shown in FIG. 10, a video live screen 302 is displayed on the video playing interface 301. A comment area 303 is overlapped with the lower half of the video live screen 302. Historical interaction information 305 and new interaction information 307 are sequentially displayed from top to bottom in the comment area 303. The new interaction information 307 may be, for example, "CCC is coming", "DDD: XXX!" and "DDD is coming".

It should be noted that when the number of words of the to-be-displayed interaction information is more than the number of remaining displayable words obtained by subtracting the number of words of the currently displayed interaction information from the number of total displayable words in the comment area, the number of words of the to-be-displayed interaction information may be subtracted from the number of total displayable words in the comment area to obtain the number of currently displayable words. Based on the number of currently displayable words, it is determined whether to continuously display the currently displayed interaction information and it is determined, among the currently displayed interaction information, interaction information that is displayable together with the to-be-displayed interaction information.

Thus, in the embodiments of the present disclosure, before the display duration of the introduction information of the live room does not reach the target duration, the user may manually trigger the hiding of the introduction information of the live room, improving the flexibility of displaying the introduction information of the live room and further improving the user experience.

Figure 11:
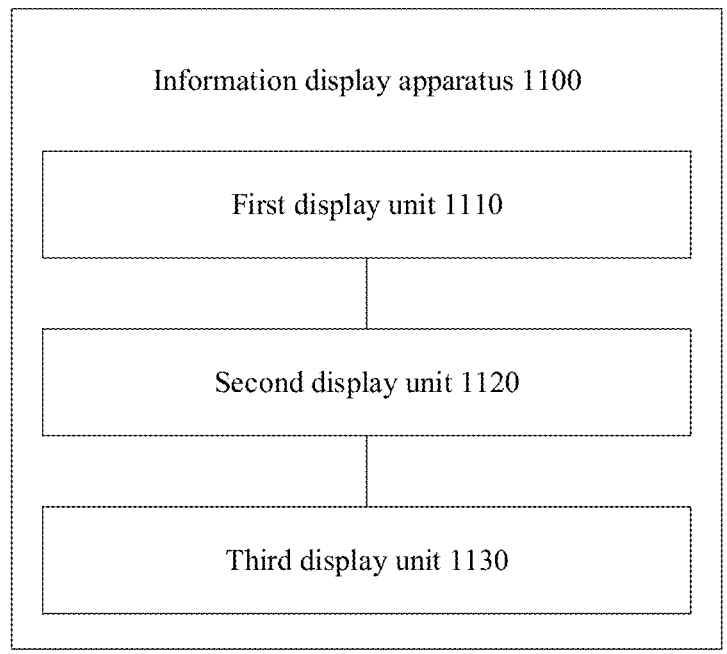
FIG. 11 is a schematic structural diagram of an information display apparatus according to an embodiment of the present disclosure.

FIG. 11 is a schematic structural diagram of an information display apparatus according to an embodiment of the present disclosure.

In some embodiments, the information display apparatus 1100 may be set in the live viewing device 101 for the client device shown in FIG. 1. In other embodiments, when the live recording device 102 in the client device shown in FIG. 1 is used for viewing a video live, the information display apparatus 1100 may be arranged in the live recording device 102, which will not be limited here. The live viewing device 101 and the live recording device 102 may be electronic devices. The electronic device may be a device with a communication function such as a mobile phone, a tablet computer, a desktop computer, a notebook computer, an in-vehicle terminal, a wearable electronic device, an all-in-one computer, and a smart home device; and may also be a device simulated with a virtual machine or an emulator.

As shown in FIG. 11, the information display apparatus 1100 may include a first display unit 1110, a second display unit 1120, and a third display unit 1130.

The first display unit 1110 may be configured to display a video playing interface of the target live room in response to detecting a first trigger operation for the target live room, where the video playing interface is provided with a comment area.

The second display unit 1120 may be configured to display introduction information of the target live room at a first information display position in the comment area.

The third display unit 1130 may be configured to hide the introduction information of the target live room when the display duration of the introduction information of the target live room reaches a target duration.

In the embodiments of the present disclosure, in response to detecting the first trigger operation performed by the user for the target live room, the video playing interface of the target live room may be displayed, where the video playing interface is provided with the comment area. The introduction information of the target live room is fixedly displayed at the first information display position in the comment area until the display duration of the introduction information of the live room reaches the target duration. Then, the introduction information of the live room is hidden. In this way, the user can acquire the video live content of the target live room through the introduction information of the live room within the target duration after entering the target live room, which increases the view count of the live streaming. In addition, after the user enters the target live room for the target duration, the introduction information of the live room is automatically hidden, which prevents the introduction information of the live room from blocking the video live content, thereby improving the user experience.

In some embodiments of the present disclosure, the information display apparatus 1100 may further include a fourth display unit. The fourth display unit may be configured to hide, in the case that the display duration of the introduction information of the target live room does not reach the target duration, the introduction information of the target live room in response to detecting a hiding operation for the introduction information of the target live room.

In some embodiments of the present disclosure, the information display apparatus 1100 may further include a first receiving unit and a fifth display unit.

The first receiving unit may be configured to receive to-be-displayed interaction information.

The fifth display unit may be configured to display an information prompt identification corresponding to the to-be-displayed interaction information at a preset position in the comment area.

Accordingly, the hiding operation may be a second trigger operation for the information prompt identification.

In some embodiments of the present disclosure, the information prompt identification may be used for prompting the number of pieces of the to-be-displayed interaction information.

In some embodiments of the present disclosure, the information display apparatus 1100 may further include a sixth display unit. The sixth display unit may be configured to display the to-be-displayed interaction information in the comment area.

In some embodiments of the present disclosure, the information display apparatus 1100 may further include a second receiving unit and a first processing unit.

The second receiving unit may be configured to receive the introduction information of the live room.

The first processing unit may be configured to insert the introduction information of the live room into a first queue position of a to-be-displayed information queue.

Accordingly, the second display unit 1120 may be further configured to display the introduction information of the live room at a first information display position corresponding to the first queue position.

In some embodiments of the present disclosure, the first queue position may be a first position of the to-be-displayed information queue, and the first information display position may be a first position for displaying information in the comment area. Alternatively, the first queue position may be a last position of the to-be-displayed information queue, and the first information display position may be a last position for displaying information in the comment area.

In some embodiments of the present disclosure, the information display apparatus 1100 may further include a third receiving unit, a second processing unit, and a seventh display unit.

The third receiving unit may be configured to receive historical interaction information of the target live room.

The second processing unit may be configured to insert the historical interaction information into a second queue position of the to-be-displayed information queue.

The seventh display unit may be configured to display the historical interaction information at a second information display position corresponding to the second queue position.

In some embodiments of the present disclosure, the information display device 1100 may further include a request sending unit. The request sending unit may be configured to send an information acquisition request to a server. The information acquisition request may be used for enabling the server to provide the introduction information of the live room in a case of determining that the target live room has a permission to display introduction information.

In some embodiments of the present disclosure, the introduction information of the live room may include at least one of anchor information, a live feature label and preset display information.

It should be noted that the information display apparatus 1100 shown in FIG. 11 can perform various steps in the method embodiments shown in FIG. 2 to FIG. 10, and realize various processes and effects in the method embodiments shown in FIG. 2 to FIG. 10, which will not be repeated herein.

An information display device is further provided according to an embodiment of the present disclosure. The information display device may include a processor and a memory. The memory is configured to store executable instructions. The processor is configured to read the executable instructions from the memory and execute the executable instructions to implement the information display method according to the above embodiments.

Figure 12:
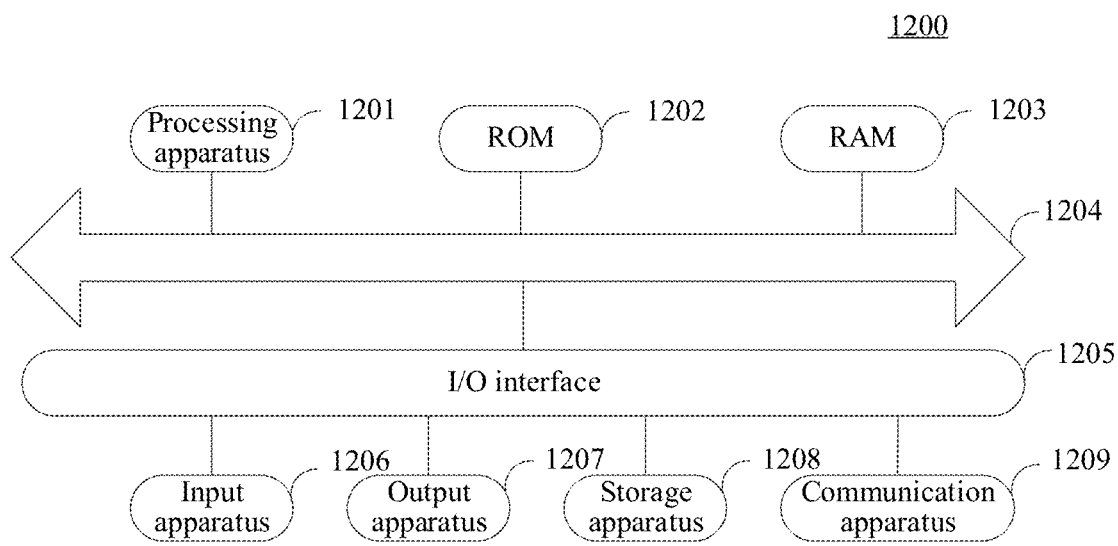
FIG. 12 is a schematic structural diagram of an information display device according to an embodiment of the present disclosure.

FIG. 12 is a schematic structural diagram of an information display device according to an embodiment of the present disclosure. Reference is made to FIG. 12, which is a schematic structural diagram of an information display device 1200 according to an embodiment of the present disclosure.

The information display device 1200 according to the embodiments of the present disclosure may be an electronic device. The electronic device may include but is not limited to, a mobile terminal such as a mobile phone, a laptop, a digital broadcast receiver, a PDA (personal digital assistant), a PAD (tablet), a PMP (portable multimedia player), an in-vehicle terminal (for example, an in-vehicle navigation terminal) and a wearable device, and a fixed terminal such as a digital TV, a desktop computer and a smart home device.

In some embodiments, the information display device 1200 may be the live viewing device 101 in the client device shown in FIG. 1. In other embodiments, in the case that the live recording device 102 in the client device shown in FIG. 1 is used for viewing a video live, the information display device 1200 may serve as the live recording device 102, which will not be limited herein.

It should be noted that the information display device 1200 shown in FIG. 12 is only an example and should not bring any restrictions on the functions and scope of usage of the embodiments of the present disclosure.

As shown in FIG. 12, the information display device 1200 may include a processing apparatus (for example, a central processing unit, a graphics processor and the like) 1201 that can execute various appropriate actions and processes according to a program stored in a read only memory (ROM) 1202 or loaded into a random access memory (RAM) 1203 from a storage apparatus 1208. Various programs and data required by operations of the information processing device 1200 are further stored in the RAM 1203. The processing apparatus 1201, the ROM 1202 and the RAM 1203 are connected to each other through a bus 1204. An input/output (I/O) interface 1205 is also connected to the bus 1204.

Generally, the following apparatus may be connected to the I/O interface 1205: an input apparatus 1206 such as a touch screen, a touchpad, a keyboard, a mouse, a camera, a microphone, an accelerometer, and a gyroscope; an output apparatus 1207 such as a liquid crystal display (LCD), a speaker, and a vibrator; a storage apparatus 1208 such as a magnetic tape, and a hard disk; and a communication apparatus 1209. The communication apparatus 1209 may allow the information display device 1200 to communicate with another device in a wireless manner or a wired manner to exchange data. Although FIG. 12 shows the information display device 1200 including various modules, it should be understood that not all of the shown modules are implemented or available. More or fewer modules may alternatively be implemented or provided.

The embodiment of the present disclosure also provides a computer-readable storage medium. The storage medium stores a computer program, which, when executed by the processor, enables the processor to implement the information display method in the above embodiment.

A computer-readable storage medium is further provided according to an embodiment of the present disclosure. The storage medium stores a computer program that, when executed by a processor, causes the processor to implement the information display method according to the above embodiments.

In particular, according to embodiments of the present disclosure, the processes described above with reference to the flowcharts may be implemented as computer software programs. For example, a computer program product is provided according to an embodiment of the present disclosure. For example, a computer program product is further provided as an embodiment in the present disclosure. The computer program product includes a computer program carried on a non-transitory computer readable medium. The computer program includes program codes for implementing the method shown in the flowchart. In the embodiments, the computer program may be downloaded and installed from the network through the communication apparatus 1209, or installed from the storage apparatus 1208, or installed from the ROM 1202. When the computer program is executed by the processing apparatus 1201, the above-mentioned functions defined in the information display method according to the embodiments of the present disclosure are implemented.

It should be noted that the computer readable medium mentioned above in the present disclosure may be a computer readable signal medium or a computer readable storage medium, or any combination thereof. The computer readable storage medium may be but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage apparatus, a magnetic storage apparatus or any combination thereof. In the present disclosure, the computer readable storage medium may be any tangible medium including or storing a program, and the program may be used by or in combination with an instruction execution system, apparatus, or device. In the present disclosure, the computer readable signal medium may include a data signal propagating in a baseband or as a part of a carrier wave with computer readable program codes embodied thereon. The propagating data signal may be in various forms, including but not limited to an electromagnetic signal, an optical signal or any proper combination thereof. The computer readable signal medium may be any computer readable medium other than the computer readable storage medium. The computer readable signal medium can send, propagate or transmit a program to be used by or in combination with an instruction execution system, apparatus or device. Program codes stored on a computer readable medium may be transmitted using any suitable medium, including, but not limited to, an electrical wire, an optical fiber cable, RF (radio frequency), or any suitable combination thereof.

In some embodiments, the client and the server may communicate using any currently known or future developed network protocol such as HTTP, and can interconnect with any form or medium of digital data communication (for example, a communication network). An example of the communication network includes a local area network ("LAN"), a wide area network ("WAN"), an Internet (for example, the Internet), and a peer-to-peer network (for example, ad hoc peer-to-peer network), and any currently known or future developed network.

The above-mentioned computer readable medium may be included in the information display device, or may be separated from the information display device, that is, not assembled in the information display device.

The above-mentioned computer readable medium carries one or more programs. The one or more programs, when executed by the information display device, cause the information display device to: display a video playing interface of the target live room, in response to detecting a first trigger operation for a target live room, where the video playing interface is provided with a comment area; display introduction information of the target live room at a first information display position in the comment area; and hide the introduction information of the live room, in a case that a display duration of the introduction information of the live room reaches a target duration.

In the embodiments of the present disclosure, the computer program codes for performing operations of the present disclosure may be written in one or more programming languages, or a combination thereof. Such programming languages include, but are not limited to, object-oriented programming languages such as Java, Smalltalk, C++, and conventional procedural programming languages such as the "C" language or similar programming languages. The program codes may be executed entirely on a user computer, partially on the user computer, as a standalone software package, partially on the user computer and partially on a remote computer, or entirely on the remote computer or a server. In a case involving a remote computer, the remote computer may be connected to a user computer or an external computer (for example, the remote computer may be connected through Internet connection by an Internet service provider) through any kind of network including local area network (LAN) or wide area network (WAN).

Flowcharts and block diagrams in the drawings illustrate the architecture, functions and operations that can be implemented by the system, method and computer program product according to the embodiments of the present disclosure. In this regard, each block in the flowcharts or block diagrams may represent a module, a program segment, or a part of codes.

The module, the program segment, or the port of codes includes one or more executable instructions for implementing specified logical functions. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each block in the block diagrams and/or flowcharts and a combination of the blocks in the block diagrams and/or flowcharts may be implemented by a dedicated hardware-based system that performs specified functions or actions, or may be realized by a combination of dedicated hardware and computer instructions.

The units involved in the embodiments of the present disclosure may be implemented in a software manner, and may also be implemented in a hardware manner. The name of the unit does not constitute a limitation of the unit under any circumstances.

The functions described above may be performed, at least in part, by one or more hardware logic components. For example, without limitation, exemplary types of hardware logic components that can be used include: field programmable gate array (FPGA), application specific integrated circuit (ASIC), application specific standard product (ASSP), system on chip (SOC), complex programmable logical device (CPLD) and the like.

In the context of the present disclosure, the machine readable medium may be a tangible medium that may include or store a program, and the program may be used by or in connection with an instruction execution system, apparatus or device. The machine readable medium may be a machine readable signal medium or a machine readable storage medium. The computer readable medium may include, but is not limited to, a system, an apparatus, or a device in an electronic, magnetic, optical, electromagnetic, infrared, or semi-conductive form, or any suitable combination thereof. More specific examples of the machine readable storage medium may include, one or more wire-based electrical connections, a portable computer disk, a hard disk, a random access memory (RAM), a read-only memory (ROM), an erasable programmable read-only memory (EPROM or fast flash memory), an optical fiber, a portable compact disc read-only memory (CD-ROM), an optical storage device, a magnetic storage device or any suitable combination thereof.

The above description includes merely preferred embodiments of the present disclosure and illustrations of the technical principles employed. Those skilled in the art should understand that the scope of the present disclosure is not limited to the technical solutions formed by combination of the technical features described above, but also covers other technical solutions formed by any combination of the above technical features or the equivalent features of the technical features without departing from the concept of the present disclosure. For example, a technical solution formed by interchanging the above features and technical features having similar functions as disclosed, but not limited to, in the present disclosure with each other is also covered with the scope of the present disclosure.

It should be noted that although the above operations are described in a specific order, it should not be understood that these operations are required to be performed in the specific order or performed in a sequential order. Under certain circumstances, multitasking and parallel processing may be advantageous. Although multiple implementation details are included in the above descriptions, the details should not be interpreted as limitations to the scope of the present disclosure. Certain features that are described in separate embodiments may be implemented in combination in a single embodiment. Alternatively, features that are described in a single embodiment may be implemented in multiple embodiments separately or in any suitable sub-combination.

Although the subject matter has been described in language specific to structural features and/or logical operations of method, it should be understood that the subject matter defined in the appended claims is unnecessarily limited to the specific features or operations described above. Instead, the specific features and operations illustrated above are merely examples of implementing the claims.

The invention claimed is:

1. An information display method, comprising:
   displaying a video playing interface of a target live room in response to detecting a first trigger operation for the target live room, wherein the video playing interface is provided with a comment area that is configured to display interaction information of the target live room;
   displaying introduction information of the target live room at a first information display position in the comment area, wherein the introduction information of the target live room includes information to explain video live content in the target live room; and
   hiding the introduction information of the target live room, in a case that a display duration of the introduction information of the target live room reaches a target duration.

2. The method according to claim 1, wherein after the displaying introduction information of the target live room, the method further comprises:
  hiding the introduction information of the target live room in response to detecting a hiding operation for the introduction information of the target live room, in a case that the display duration of the introduction information of the target live room does not reach the target duration.

3. The method according to claim 2, wherein before the hiding operation for the introduction information of the target live room is detected, the method further comprises:
  receiving to-be-displayed interaction information; and
  displaying an information prompt identification corresponding to the to-be-displayed interaction information, at a preset position in the comment area,
    wherein the hiding operation is a second trigger operation for the information prompt identification.

4. The method according to claim 3, wherein the information prompt identification is used for prompting the number of pieces of the to-be-displayed interaction information.

5. The method according to claim 3, wherein after the hiding the introduction information of the target live room, the method further comprises:
  displaying the to-be-displayed interaction information in the comment area.

6. The method according to claim 1, wherein before displaying introduction information of the target live room, the method further comprises:
  receiving the introduction information of the target live room; and
  inserting the introduction information of the target live room into a first queue position of a to-be-displayed information queue; and
  wherein the displaying introduction information of the target live room at a first information display position in the comment area comprises:
    displaying the introduction information of the target live room at the first information display position corresponding to the first queue position.

7. The method according to claim 6, wherein
  the first queue position is a first position in the to-be-displayed information queue, and the first information display position is a first position for displaying information in the comment area; or
  the first queue position is a last position in the to-be-displayed information queue, and the first information display position is a last position for displaying information in the comment area.

8. The method according to claim 6, wherein after the first trigger operation for the target live room is detected, the method further comprises:
  receiving historical interaction information of the target live room;
  inserting the historical interaction information into a second queue position of the to-be-displayed information queue; and
  displaying the historical interaction information at a second information display position corresponding to the second queue position.

9. The method according to claim 6, wherein before the receiving the introduction information of the target live room, the method further comprises:
  sending an information acquisition request to a server, wherein the information acquisition request is used for enabling the server to provide the introduction information of the target live room in a case of determining that the target live room has a permission to display the introduction information of the target live room.

10. The method according to claim 1, wherein the introduction information comprises at least one of anchor information, a live feature label and preset display information.

11. An information display device, comprising:
  a memory configured to store executable instructions; and
  a processor configured to read the executable instructions from the memory and execute the executable instructions to:
    display a video playing interface of a target live room in response to detecting a first trigger operation for the target live room, wherein the video playing interface is provided with a comment area that is configured to display interaction information of the target live room;
    display introduction information of the target live room at a first information display position in the comment area, wherein the introduction information of the target live room includes information to explain the video live content in the target live room; and
    hide the introduction information of the target live room, in a case that a display duration of the introduction information of the target live room reaches a target duration.

12. The information display device according to claim 11, wherein after introduction information of the target live room is displayed, the processor is configured to read the executable instructions from the memory and execute the executable instructions to:
  hide the introduction information of the target live room in response to detecting a hiding operation for the introduction information of the target live room, in a case that the display duration of the introduction information of the target live room does not reach the target duration.

13. The information display device according to claim 12, wherein before the hiding operation for the introduction information of the target live room is detected, the processor is configured to read the executable instructions from the memory and execute the executable instructions to:
  receive to-be-displayed interaction information; and
  display an information prompt identification corresponding to the to-be-displayed interaction information, at a preset position in the comment area,
    wherein the hiding operation is a second trigger operation for the information prompt identification.

14. The information display device according to claim 13, wherein the information prompt identification is used for prompting the number of pieces of the to-be-displayed interaction information.

15. The information display device according to claim 13, wherein after the introduction information of the target live room is hidden, the processor is configured to read the executable instructions from the memory and execute the executable instructions to:
  display the to-be-displayed interaction information in the comment area.

16. The information display device according to claim 11, wherein before introduction information of the target live room is displayed, the processor is configured to read the executable instructions from the memory and execute the executable instructions to:
  receive the introduction information of the target live room; and insert the introduction information of the target live room into a first queue position of a to-be-displayed information queue; and wherein the processor is further configured to read the executable instructions from the memory and execute the executable instructions to:

display the introduction information of the target live room at the first information display position corresponding to the first queue position.

17. The information display device according to claim 16, wherein the first queue position is a first position in the to-be-displayed information queue, and the first information display position is a first position for displaying information in the comment area; or the first queue position is a last position in the to-be-displayed information queue, and the first information display position is a last position for displaying information in the comment area.

18. The information display device according to claim 16, wherein after the first trigger operation for the target live room is detected, the processor is configured to read the executable instructions from the memory and execute the executable instructions to:

receive historical interaction information of the target live room;

insert the historical interaction information into a second queue position of the to-be-displayed information queue; and display the historical interaction information at a second information display position corresponding to the second queue position.

19. The information display device according to claim 16, wherein before the introduction information of the target live room is received, the processor is configured to read the executable instructions from the memory and execute the executable instructions to:

send an information acquisition request to a server, wherein the information acquisition request is used for enabling the server to provide the introduction information of the target live room in a case of determining that the target live room has a permission to display the introduction information of the target live room.

20. A non-transitory computer readable storage medium, wherein the computer readable storage medium stores a computer program that, when executed by a processor, causes the processor to:

display a video playing interface of a target live room in response to detecting a first trigger operation for the target live room, wherein the video playing interface is provided with a comment area that is configured to display interaction information of the target live room;

display introduction information of the target live room at a first information display position in the comment area, wherein the introduction information of the target live room includes information to explain the video live content in the target live room; and hide the introduction information of the target live room, in a case that a display duration of the introduction information of the target live room reaches a target duration.

\* \* \* \* \*